US011722175B1

(12) United States Patent
Hansen et al.

(10) Patent No.: US 11,722,175 B1
(45) Date of Patent: Aug. 8, 2023

(54) CONTACT TRACING SOLUTION TO COMBAT THE SPREAD OF INFECTIOUS DISEASES USING NEAR FIELD COMMUNICATIONS

(71) Applicants: Thorkild Hansen, Boxford, MA (US); Michael Oristaglio, Newtown, CT (US)

(72) Inventors: Thorkild Hansen, Boxford, MA (US); Michael Oristaglio, Newtown, CT (US)

( * ) Notice: Subject to any disclaimer, the term of this patent is extended or adjusted under 35 U.S.C. 154(b) by 0 days.

(21) Appl. No.: 17/367,551

(22) Filed: Jul. 5, 2021

(51) Int. Cl.
| | |
|---|---|
| *H04W 8/00* | (2009.01) |
| *H04W 4/02* | (2018.01) |
| *H04W 12/08* | (2021.01) |
| *H04L 29/06* | (2006.01) |
| *G06F 21/62* | (2013.01) |
| *H04B 5/00* | (2006.01) |

(52) U.S. Cl.
CPC .................................. *H04B 5/0031* (2013.01)

(58) Field of Classification Search
None
See application file for complete search history.

(56) References Cited

U.S. PATENT DOCUMENTS

| | | | | |
|---|---|---|---|---|
| 9,344,436 | B1 * | 5/2016 | Sheng | H04W 12/08 |
| 9,432,361 | B2 * | 8/2016 | Mahaffey | H04L 63/0853 |
| 9,538,336 | B2 * | 1/2017 | Rudow | H04M 1/72457 |
| 9,716,964 | B1 * | 7/2017 | Sheng | H04W 4/20 |
| 9,824,248 | B2 * | 11/2017 | Sheng | H04W 4/026 |
| 10,083,319 | B2 * | 9/2018 | Wilmes | G06F 21/44 |
| 10,094,663 | B2 * | 10/2018 | Kesäniemi | G01C 25/00 |
| 10,852,917 | B2 * | 12/2020 | Zurek | G06F 3/1454 |
| 11,159,932 | B1 * | 10/2021 | Meyer | G06F 3/016 |
| 2013/0002489 | A1 * | 1/2013 | Erad | H01Q 21/29 |
| | | | | 342/432 |

(Continued)

*Primary Examiner* — Tuan A Tran

(57) ABSTRACT

This disclosure describes methods for contact tracing using information from devices for near-field communications (NFC), combined with auxiliary information from other (non-NFC) sensors such as inertial motion sensors (accelerometers and gyroscopes) and magnetometers. Methods using low-frequency NFC in the low MHz range of frequencies have the advantage of being robust in the presence of interfering objects, unlike other means of communication and proximity tracking using much higher frequency electromagnetic signals such as Bluetooth, GPS, and laser positioning. The method relies on unique features of NFC using inductively coupled devices to solve an optimization problem yielding the closest distance of approach of two NFC devices and can be adapted to handle multiple pairs of devices simultaneously. Location data is only required and generated in a local coordinate system (independent of absolute locations) which helps to preserve privacy. An individual device that determines the presence of another device within a prescribed distance (e.g., 2 meters or 6 feet) stores a unique identifier of the other device along with a timestamp in its memory in encrypted form and separately uploads this same information securely to a central database. The methods disclosed can also be used for other applications such as gaming where keeping track of contacts between participants in a local coordinate system, while maintaining privacy, is useful.

10 Claims, 4 Drawing Sheets

Transmitter

Receiver

(56) References Cited

U.S. PATENT DOCUMENTS

| | | | |
|---|---|---|---|
| 2016/0198300 A1* | 7/2016 | Rothschild | H04W 4/021 455/456.3 |
| 2018/0052216 A1* | 2/2018 | Vered | G01S 5/0072 |
| 2021/0136600 A1* | 5/2021 | Le | H04W 4/026 |
| 2022/0038883 A1* | 2/2022 | Meyer | H04W 4/026 |

* cited by examiner

CONTACT TRACING SOLUTION TO COMBAT THE SPREAD OF INFECTIOUS DISEASES USING NEAR FIELD COMMUNICATIONS

PRIORITY CLAIM

This application claims priority to U.S. Provisional Patent Application No. 63/050,230 entitled "Contact Tracing Solution to Combat the Spread of Infectious Diseases using Near Field Communications" to Thorkild Hansen et al. and filed on Jul. 10, 2020.

TECHNICAL FIELD

This disclosure relates to Near Field Communication ("NFC"). More particularly, the disclosure relates to a method and apparatus for determining the distance between two NFC devices, storing the information in encrypted format on the device, and relaying this information securely to a central database.

BACKGROUND

Near Field Communication (NFC) is a set of short-range wireless technologies that operate within the globally available and unlicensed radio frequency ISM band of 13.56 MHz. The air interface for NFC is standardized in ISO/IEC 18092/ECMA-340, "Near Field Communication Interface and Protocol-1 (NFCIP-1)" and ISO/IEC 21481/ECMA-352 "Near Field Communication Interface and Protocol-2 (NFCIP-2)", available from www.ecma-international.org. NFC is an extension to Radio Frequency Identification (RFID), and the standards governing NFC originated in RFID.

NFC has a wide range of applications such as the following possibilities:

Mobile ticketing for public transport, movies, concerts, and sporting events.

Mobile payment where users can pay for goods using NFC-enabled devices, either NFC-enabled phones with stored data that act as a debit/credit payment card or NFC-powered contactless payment cards placed in proximity of readers.

Smart posters and objects: NFC-enabled phones can be used to read RFID tags on commercial establishments' signs for information or promotions or scan outdoor billboards.

Bluetooth pairing: in the future, pairing of Bluetooth 2.1 devices with NFC support will be as easy as bringing them close together and accepting the pairing.

Peer to peer (P2P) payment: users can make payment to each other by tapping phones together and entering the amount of money to be transferred; identity documents: governments, employers, and other organizations will use NFC to power contactless identity cards. The typical range for P2P transitions is 1 meter.

Electronic keys: NFC-enabled phones can serve as replacements for physical car keys, house/office keys, and hotel room keys.

Health and safety applications, such as water monitoring; diet, diabetes, blood pressure, and alcohol consumption monitoring. Home healthcare visits and campus safety check-ins.

Social networking: users can exchange contacts, resumes, and location-based personal networks using NFC-enabled phones or smart business cards and P2P file exchange.

Smart mobility: consumers can obtain access to shared car and bicycle services and search for rides with carpoolers; entertainment: consumers can use NFC-enabled phones to participate in multiplayer games, create and track athletic challenges and participate in urban games.

P2P communication in gaming.

Infectious diseases can spread from person to person through respiratory droplets produced when an infected person coughs or sneezes. These droplets can land in the mouths or noses of people who are nearby or possibly be inhaled into the lungs. Spread is more likely when people are in close contact with one another. Contact tracing is a strategy to prevent a virus from spreading freely. With this strategy, one must identify and contact every individual who has been within a short distance of an infected person (typically about 2 meters or 6 feet).

Radio signals carrying the data to be transferred between NFC transceivers (a transceiver is a device such as a cell phone that can both transmit and receive) are not confined to the immediate vicinity of these transceivers. Studies have revealed that NFC communications can have a range of at least 5 meters which is sufficient to allow NFC transceivers to be used in close-contact tracing.

Seknion Inc. has developed technology related to security in wireless communications and radio frequency identification (RFID) disclosed in U.S. Pat. Nos. 7,398,078, 7,751,799, 7,456,726, 7,889,054, 7,605,684, and 8,909,141. This technology includes the use of NFC signals for the precise location of RFID tags and the use of advanced coil systems for achieving desired decay rates of NFC signals.

Cell phones with NFC capabilities, inertial motion sensors, such as three-axis accelerometers and three-axis gyroscopes, and magnetometers (magnetic compasses) are ubiquitous, thereby making them capable of recording and relaying the information that is required for widespread precision contact tracing. This disclosure describes a reliable system that takes into account both the coil orientations and the vector nature and decay rate of the NFC signals emitted by cell phones. Such a system is better than methods that rely on GPS, cell-phone positioning, and Bluetooth—which due to scattering and blockages of their high-frequency signals are prone to produce many false positives and false negatives. The NFC solution is less susceptible to scattering and blockages due to its much lower operating frequency. This solution can be designed to work in a local coordinate system that does not require tracking precise absolute locations of the NFC devices, thereby helping to guard privacy.

BRIEF SUMMARY

The distance between two NFC devices may be estimated to high accuracy by analyzing the recorded output of one device due to an NFC signal transmitted by the second device, provided that auxiliary information about the relative orientations of the two devices and about the direction vector from one device to the other is known from data supplied by other (non-NFC) sensors, such as accelerometers and gyroscopes (collectively known as internal motion sensors) and magnetometers. In fact, the auxiliary data supplied by these non-NFC sensors can under certain conditions be used to estimate the distance between the two devices directly, without the use of NFC signals, but such estimates are subject to systematic errors ("drift") which can significantly degrade their accuracy. Exchanging NFC signals between the two devices improves the robustness and accuracy of the estimation algorithm and maintains accuracy. There are myriad ways to obtain and process the auxiliary information from other sensors. In one embodiment, inertial motion sensors are used to obtain this information. In another embodiment, magnetometer data are used. In other embodiments, various combinations of accelerometer, gyroscopic, and magnetometer data are used. In yet another embodiment, the distances between multiple devices are determined simultaneously by encoding transmitted signals so that a receiver can distinguish between multiple transmitters. In other embodiments: distance may be estimated using an upper threshold for the received field to determine whether or not two devices have been in close proximity, and distance may be estimated directly from the NFC signal when the two devices are in a special relative orientation. All of these embodiments and modes of operation are available in modern smartphones. The methods described in this disclosure operate in a local coordinate system that relies only on relative positioning information and does not require the tracking and storage of precise absolute positioning, thereby helping to guard privacy. In all of the embodiments, the two NFC devices have the option to exchange unique identifiers, such as a MAC address, allowing proximity data to be tagged to particular pairs of devices; the proximity information can be encrypted and stored on the individual devices and can be uploaded securely to a central database using standard network communications protocols. The methods described in this disclosure can be used in applications outside of contract tracing for infectious diseases such as gaming where keeping track of contacts between participants is useful.

BRIEF DESCRIPTION OF THE DRAWINGS

For a more complete understanding of the present disclosure, reference is now made to the following descriptions taken in conjunction with the accompanying drawings.

DETAILED DESCRIPTION

The distance between two NFC devices may be estimated according to one embodiment by analyzing the recorded output of one device due to the known signal transmitted by the other. In another embodiment, accelerometer data are used. In another embodiment, gyroscopic data are used. In another embodiment, accelerometer, gyroscopic, and magnetometer data are used. In yet another embodiment, the distances between multiple devices are determined simultaneously by encoding transmitted signals so that a receiver can distinguish between multiple transmitters. Distance may further be estimated by another embodiment using an upper threshold for the received field as an estimation of whether or not two devices have been in close contact and by an embodiment using a simple formula that holds when the two devices are in a special relative orientation.

Figure 1:
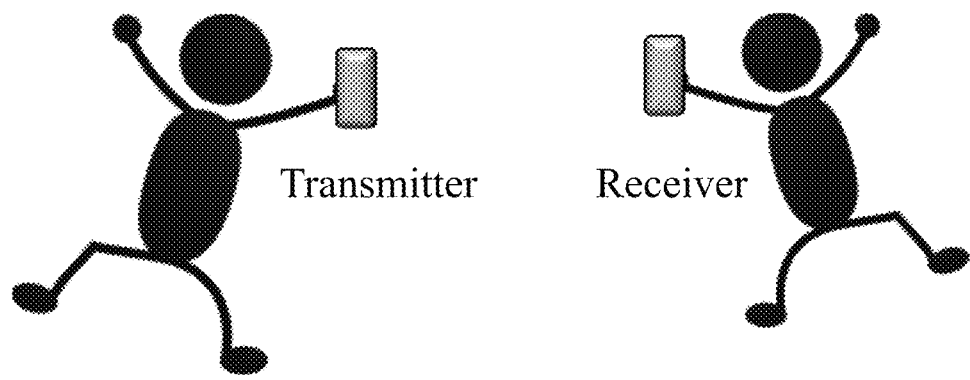
FIG. 1 is a schematic illustrating a transmitting cell phone that broadcasts an electromagnetic field to a receiving cell phone according to one embodiment of the disclosure.
Figure 2:
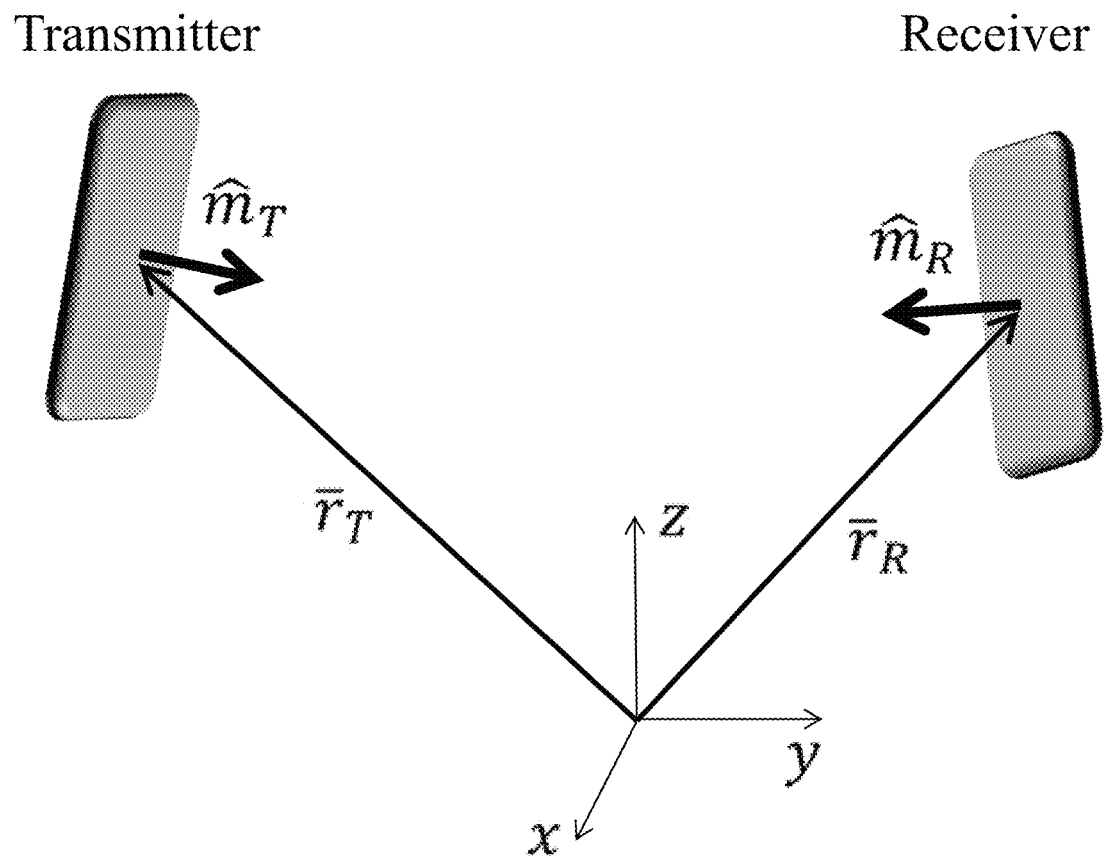
FIG. 2 is a schematic illustrating a transmitting cell phone with reference point at $\bar{r}_T$ and magnetic-moment direction $\hat{m}_T$ that broadcasts an electromagnetic field to a receiving cell phone with reference point at $\bar{r}_R$ and magnetic-moment direction $\hat{m}_R$ according to one embodiment of the disclosure.
Figure 3:
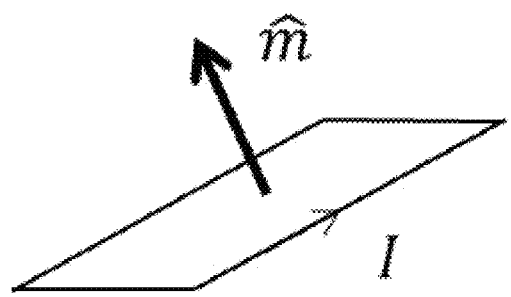
FIG. 3 is a schematic illustrating a rectangular coil in a planar geometry with current of strength I that produces a magnetic moment in the direction $\hat{m}$ according to one embodiment of the disclosure.

FIG. 1 is a schematic illustrating one individual carrying a transmitter that broadcasts an electromagnetic field, which is recorded by a receiver carried by another individual. FIG. 2 shows the transmitter and receiver in a global (x, y, z) coordinate system. The transmitter and receiver reference points are at $\bar{r}_T$ and $\bar{r}_R$, respectively. The corresponding directions of the magnetic moments of the transmitter and receiver are given by the unit vectors $\hat{m}_T$ and $\hat{m}_R$, respectively. FIG. 3 shows the direction indicated by the unit vector $\hat{m}$ of the magnetic moment generated by a rectangular coil carrying electrical current I. According to one embodiment, the signal induced in the receiver can be modeled as $$I_R = K \frac{3(\hat{m}_T \cdot \hat{r})(\hat{m}_R \cdot \hat{r}) - \hat{m}_T \cdot \hat{m}_R}{4\pi r^3}, r = |\bar{r}_R - \bar{r}_T|, \hat{r} = \frac{\bar{r}_R - \bar{r}_T}{r}, \quad (E1)$$

where K is a known scalar determined by the transmitter current and the known specifications of both the transmitter and receiver; r is the distance between the transmitter and receiver reference points; and $\hat{r}$ is the unit vector pointing from the reference point of the transmitter to the reference point of the receiver.

The unit vectors $\hat{m}_T$ and $\hat{m}_R$ can be expressed in terms of spherical coordinates (r, θ, φ) as $$\hat{m}_T = \hat{x} \cos \varphi_T \sin \theta_T + \hat{y} \sin \varphi_T \sin \theta_T + \hat{z} \cos \theta_T$$

and $$\hat{m}_R = \hat{x} \cos \varphi_R \sin \theta_R + \hat{y} \sin \varphi_R \sin \theta_R + \hat{z} \cos \theta_R$$

where $\hat{x}$, $\hat{y}$, and $\hat{z}$ are the unit vectors of the rectangular (x, y, z) coordinate system.

Figure 4:
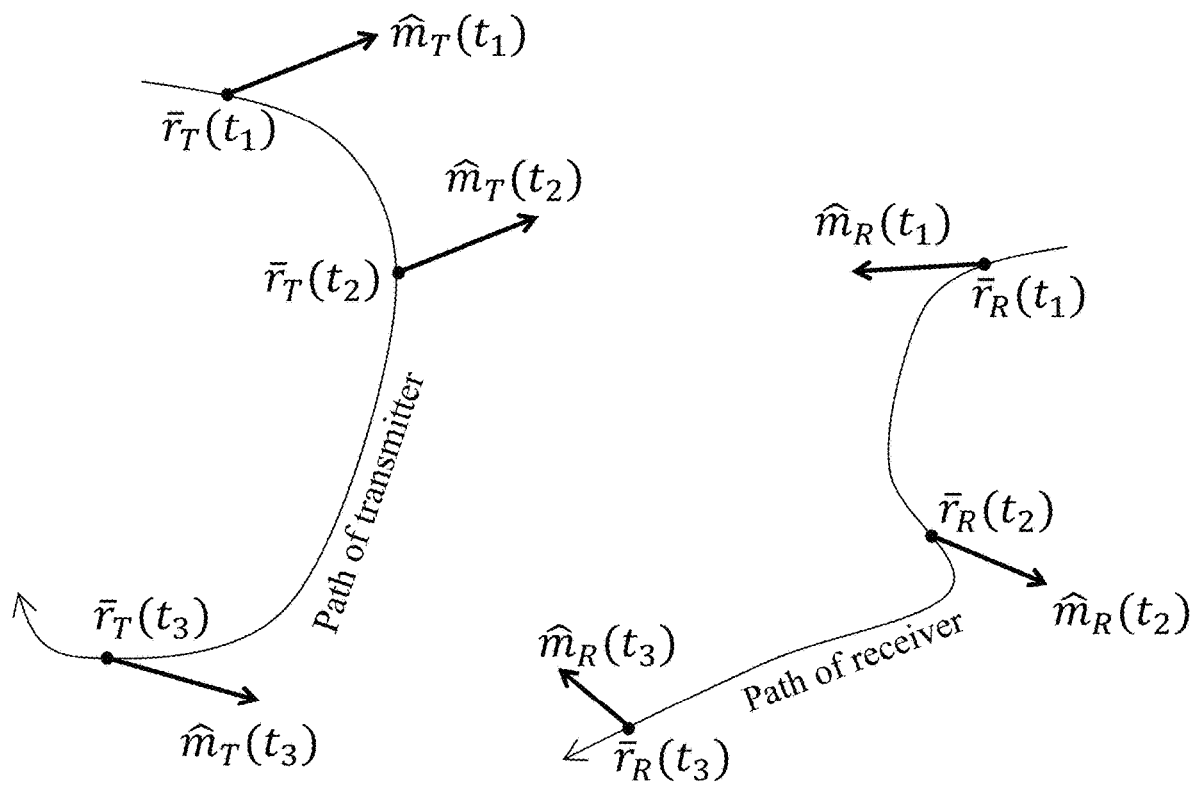
FIG. 4 is a schematic illustrating a moving transmitter and a moving receiver according to one embodiment of the disclosure.

FIG. 4 is a schematic illustrating the top view of possible paths taken by the transmitter and receiver with positions and magnetic-moment directions shown at three different times $t=t_1$, $t=t_2$, and $t=t_3$. The phone knows its orientation and direction of movement at all times by continuously integrating results from gyroscope, accelerometers, and magnetometer. Hence, $\hat{m}_T(t)$ and $\hat{m}_R(t)$ are known. Moreover, $\bar{r}_R(t)$ and $\bar{r}_T(t)$ are known in the global coordinate system in FIG. 2 up to constant velocity and position vectors:

$$\bar{r}_R(t) = \bar{r}_{RL}(t) + (t-t_1)\bar{v}_{R0} + \bar{r}_{R0}, \bar{r}_T(t) = \bar{r}_{TL}(t) + (t-t_1)\bar{v}_{T0} + \bar{r}_{T0}, \quad (E2)$$

where $\bar{r}_{TL}(t)$ and $\bar{r}_{RL}(t)$ are the known location vectors for the transmitter and receiver in local coordinate systems, $\bar{v}_{T0}$ and $\bar{v}_{R0}$ are unknown time-independent velocity vectors, and $\bar{r}_{T0}$ and $\bar{r}_{R0}$ are unknown time-independent position vectors. Therefore, $\bar{r}_R(t) - \bar{r}_T(t)$ can be written in terms of a known time-dependent vector $\bar{r}_K(t)$ as $$\bar{r}_R(t) - \bar{r}_T(t) = (t-t_1)\bar{v}_0 + \bar{r}_0 + \bar{r}_K(t) \quad (E3)$$

where $\bar{r}_0$ and $\bar{v}_0$ are time-independent position and velocity vectors, which can be determined from the recorded receiver output $I_R^r(t)$ as follows. Assume that $I_R^r(t_n)$, $\bar{r}_K(t_n)$, $\hat{m}_T(t_n)$, and $\hat{m}_R(t_n)$ are known for n=1,2,3, ..., N, so that (E1) in combination with (E3) produce N equations for determining the six unknowns in the velocity and position vectors $\bar{v}_0$ and $\bar{r}_0$. In one embodiment of the invention, the three rectangular components of each of the vectors $\bar{v}_0$ and $\bar{r}_0$ are determined from an optimization procedure that minimizes the cost function $$C(\bar{v}_0, \bar{r}_0) = \sum_{n=1}^{N} |I_R(t_n, \bar{v}_0, \bar{r}_0) - I_R^r(t_n)|, \quad (E4)$$

where $I_R(t_n, \bar{v}_0, \bar{r}_0)$ is the model-receiver output (E1) with (E3) inserted. Once $\bar{v}_0$ and $\bar{r}_0$ are known, one can compute $r(t)=|\bar{r}_R(t)-\bar{r}_T(t)|$ from (E3) and determine the minimum distance between the transmitter and receiver. In another embodiment, the vector $\bar{v}_0$ is zero. In yet another embodiment, the vector $\bar{r}_0$ is zero. In a further embodiment, the model constant K in (E3) is included as an unknown in the optimization of the cost function.

Optimization of the cost function (E4) can be accomplished by standard methods of nonlinear optimization known to those skilled in the art. Such methods include but are not limited to nonlinear least-squares optimization by Gauss-Newton iteration, by Marquardt-Levenberg iteration, by Kalman filtering, and by gradient and conjugate gradient descent.

A special case of (E1) occurs when either one of the magnetic moments $\hat{m}_T$ or $\hat{m}_R$ is perpendicular to the direction vector $\hat{r}$ pointing from one device to the other (so that either $\hat{m}_T \cdot \hat{r}=0$ or $\hat{m}_R \cdot \hat{r}=0$). In this special case, the output of the receiver $I_R$ is sufficient to determine the distance from $$r = \left(\frac{4\pi}{K}|I_R|\right)^{1/3}. \quad (E5)$$

This direct formula can be used as a check on the results of the optimization of the cost function (E4).

The methods described in this disclosure require the exchange of information between NFC devices, which can be accomplished using standard NFC communications protocols. A minimum of information can be exchanged in order to ensure that privacy is protected. Privacy is further enhanced by the limited broadcast range of NFC devices, which typically extends to at most 10 meters. The information exchanged includes: a unique identifier (UI) for each device, such as the device's MAC address and the most recent information about its orientation and position necessary to solve the optimization problem (E4). The exchange of UIs between devices allows an individual device to solve the optimization problem (E4) for each device in its vicinity separately. Once a particular device, call it D1, has solved the optimization problem for other devices in its vicinity and determined the distances from itself to the other devices, the information stored on device D1 can consist of the UI of each device that came within a prescribed distance (e.g., 2 meters or 6 feet) of D1 and a time stamp of when such close approach occurred. This information can be transmitted securely to a central database, using standard protocols for secure transmission; this same information can also be encrypted and stored securely on the device itself. All other information is securely deleted from the device's memory.

The methods described in this disclosure can be further enhanced by using the methods described in the following U.S. patents: U.S. Pat. Nos. 7,398,078, 7,751,799, 7,456,726, 7,889,054, 7,605,684, and 8,909,141. This technology includes the use of advanced coil systems for achieving desired decay rates of NFC signals and broadcasting a combination of information signals and scramble or cloaking signals designed to limit the range at which NFC signals are decodable and thereby enhance the security of communications.

What is claimed is:

1. A method for determining distances between devices, comprising: transmitting a wireless signal by a first device; receiving said wireless signal by a second device; recording, by the second device, auxiliary information comprising the relative orientations of the first and second devices and the direction vectors from the first device to the second device and from the second device to the first device; and processing, by the second device, said received signal and said auxiliary information.

2. The method of claim 1, in which the step of recording said auxiliary information comprises the use of internal motion sensors.

3. The method of claim 1, in which the step of recording said auxiliary information comprises the use of magnetometers.

4. The method of claim 1, in which the step of transmitting said signal comprises transmitting an encoded signal.

5. The method of claim 1, in which said devices exchange unique identifiers.

6. The method of claim 1, in which the step of processing said received signal and said auxiliary information comprises encryption.

7. The method of claim 1, in which the step of processing said received signal and said auxiliary information comprises uploading to a central database.

8. The method of claim 1, in which the step of processing said received signal and said auxiliary information comprises the use of fixed orientations of said devices.

9. The method of claim 1, in which the step of processing said received signal and said auxiliary information comprises the use of an upper threshold for said received signal.

10. The method in claim 1, in which the step of processing said received signal and said auxiliary information comprises minimizing a cost function.

\* \* \* \* \*